United States Patent [19]

Surace et al.

[11] Patent Number: 4,494,761
[45] Date of Patent: Jan. 22, 1985

[54] LUBRICATING OIL SEAL DEVICE FOR ROTATING SHAFT BEARINGS

[75] Inventors: Filippo Surace; Giampaolo Garcea, both of Milan, Italy

[73] Assignee: Alfa Romeo S.p.A., Napoli, Italy

[21] Appl. No.: 485,042

[22] Filed: Apr. 14, 1983

[30] Foreign Application Priority Data

Apr. 15, 1982 [IT] Italy .................. 20776 A/82

[51] Int. Cl.³ ............................................. F16J 15/42
[52] U.S. Cl. ........................................ 277/67; 277/68
[58] Field of Search ...................... 277/67, 68, 25, 13, 277/69

[56] References Cited

U.S. PATENT DOCUMENTS 3,236,529  2/1966  Heim .................................... 277/67

FOREIGN PATENT DOCUMENTS 66999  5/1969  German Democratic Rep. ... 277/67
1282719  7/1972  United Kingdom ................. 277/67

*Primary Examiner*—Robert I. Smith
*Attorney, Agent, or Firm*—Charles E. Brown

[57] ABSTRACT

This invention relates to a lubricating oil seal device for a rotating shaft support bearing, which is arranged to prevent the emergence of said oil from a collection chamber disposed at one end of the bearing, by means of a stream of air created in an annular meatus provided in the passage which communicates with said chamber.

6 Claims, 1 Drawing Figure

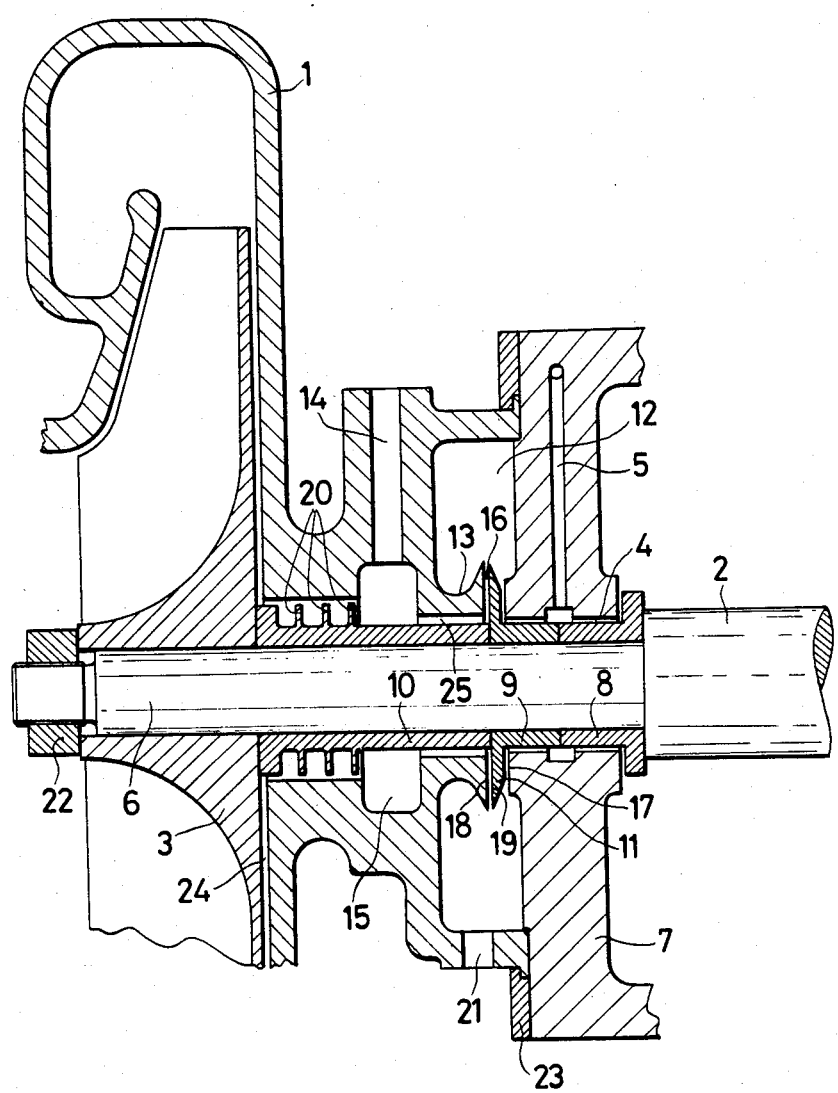

LUBRICATING OIL SEAL DEVICE FOR ROTATING SHAFT BEARINGS

An oil sealing problem arises at smooth or rolling bearings at the ends of rotating shafts, in particular when the shaft end projects beyond the bearing into an environment from which the bearing lubricating oil has to be excluded, and this problem has to be solved. In those cases, an effective seal is obtained only with devices in which fixed sealing elements are kept in contact with surfaces which rotate together with the shaft. A friction moment occurs in a position corresponding with this sliding contact, and its extent depends on the load between the surfaces under relative movement, on the nature of the surfaces, on their degree of machining (ie on their surface roughness), and also on whether a lubricating oil film is present or absent between said surfaces. If the seal must be absolute, then the existence of said oil film is precarious, and may even have to be completely dispensed with.

The sliding contact absorbs a certain amount of power, in relation to said friction moment. This power is dissipated locally in the form of heat, and can cause overheating and wear of the contacting elements.

This is obviously aggravated in the case of high rotational speeds, for example in the case of the shaft of centifugal compressors for supercharging internal combustion engines.

The present invention relates to a lubricating oil seal device for a bearing which supports a shaft in proximity to one end thereof which projects into an environment from which the oil must be absent, said device being free from mutually contacting elements which move relative to each other.

The solution is based on the simultaneous and combined use of a certain number of special design arrangements which, both individually and overall, prevent oil escaping to the outside.

The problem lies essentially in the known fact that the lubricating oil is projected from one end of one of the rotating shaft bearings through an annular passage into a collection chamber provided in the machine stator. This oil can adhere to the various chamber walls, and can also diffuse in the form of droplets into the air contained in the chamber, which is provided with a drain hole in one of its walls. The end of the shaft on to which the element rotated by said shaft, for example the centrifugal impeller of a supercharger compressor, is keyed passes through the annular stator passage which conveys the lubricating oil into the collection chamber.

The solution to the problem has been confronted by considering that the oil present in the chamber can reach the outside through the annular passage for three different reasons, namely;

because the air inside the chamber flows to the outside through said annular passage and entrains oil droplets which can thus reach the outside;

because the oil film adhering to the inner chamber wall in the zone around the annular passage also extends on to the inner passage surface, and thus reaches the outside;

because the oil film adhering to the outer surface of the shaft on that shaft portion inside the chamber also extends along the shaft into the portion which passes through the annular passage, and thus reaches the outside.

The object of the device according to the present invention is to prevent the escape of an oil to the outside of the collection chamber by proposing a solution which is particularly effective with regard to the seal, and particularly advantageous with regard to the absorbed power.

The lubricating oil seal device according to the invention comprises a disc rigid with the shaft at one end of a bearing, and an annular passage provided in the stator in a position also corresponding with the end of said bearing to allow the lubricating oil to flow into a collection chamber provided in the stator, the device being characterised in that said disc is inserted into said passage such that at least one annular wall is disposed close to the annular wall of said passage in order to form an annular meatus, the inner periphery of said annular meatus being in communication with the external environment by way of a port provided in the stator.

The oil film which at the bearing outlet adheres to the shaft and to the disc wall is interrupted upstream of the meatus formed between said disc and that annular wall of said passage which faces it, because it is projected radially by centrifugal action and is prevented from flowing towards said meatus. In this respect, with the proposed solution an annular surface of the disc is positioned a very small axial distance from an analogous annular fixed surface of the annular passage wall. Communication between the collection chamber and the external environment is therefore by way of the thin meatus existing between said annular surfaces.

When the shaft rotates, the air which exists in the meatus adheres to both the rotating and to the fixed annular surface, and it can be considered that it is caused to rotate at a velocity which is one half that of the rotating surface. A centrifugal field and thus a head is formed in this manner inside the meatus. Because of this head, the air in the meatus assumes a radial velocity component which is directed towards the chamber interior, and prevents the oil droplets dispersed within the chamber from being conveyed to the outside. Thus the centrifugal air stream existing in the meatus prevents the oil film which wets the disc from escaping to the outside by way of said meatus.

As said centrifugal head is fairly small, its effect must be prevented from being nullified by any centrifugal heads which exist at the outer end of the shaft (said heads are present especially if a centrifugal compressor impeller is keyed on to said outer end) which tend to reverse the radial velocity direction in said thin meatus between the rotating disc and the annular passage wall. For this purpose, the proposed device comprises around the shaft an annular chamber disposed between said thin meatus and the outer end at which disturbing centrifugal heads can exist. This annular communicates with the inner periphery of the meatus by way of an annular interstice concentric with the shaft, and also communicates with a "tranquil" zone by way of a suitably dimensioned port.

Labyrinth seals may, if desired, be inserted between said annular chamber and the environment into which the shaft emerges. Because of the pressure drops (Borda type) which these cause, the disturbance due to any vacuum conditions which may exist in said environment is in fact reduced.

In this manner, the pressure in said annular chamber is equal to the external pressure, and the effect of any disturbing head which exist at the outer end of the shaft is nullified.

A "gutter" effect is also attained in the device by providing one wall of the collection chamber with an annular channel which causes the oil adhering to the chamber wall to be deviated towards the bottom of said chamber. This is because the concave wall of the annular channel intersects by means of a sharp edge that wall of the annular passage which forms a meatus with the disc rigid with the shaft. In this manner, the oil originating from the chamber wall does not rise as far as the channel edge, and any oil droplets which might fall on to the edge are also deviated downwards and do not wet that surface of the annular passage which faces the disc.

It is therefore at said annular surface that the oil film adhering to the collection chamber walls is interrupted and is unable to proceed towards the external environment. The aforesaid will be more apparent with the aid of the accompanying figure, which shows a preferred embodiment of the seal device according to the invention by way of non-limiting example.

The FIGURE represents an axial section through part of the centrifugal compressor of a turbo compressor unit for supercharging an internal combustion engine.

In the FIGURE the reference numerals 1 and 7 indicate the two parts of the stator body which are fixed together by means of the flange 23 and bolts, not shown. The reference numeral 2 indicates the shaft of the turbo compressor unit, and 3 the centrifugal compressor impeller which is rigid with the journal 6 of the shaft 2. The reference numeral 4 indicates one of the bearings which support the shaft 2. The bearing 4 is of smooth type, and is lubricated by oil under pressure by way of the duct 5. On the journal 6 there are mounted the sleeves 8 and 9 situated by the bearing 4, and the sleeve 10 disposed between the impeller 3 and sleeve 9. The three sleeves are locked axially by the nut 22. With one end of the sleeve 9 there is rigid a disc indicated by 11, which is inserted into an annular passage 16 formed by the walls 17 and 18 of the parts 1 and 7 of the stator body.

The distance between the wall 18 and that wall 19 of the disc 11 which faces it is at most a few tenths of a millimeter, and preferably about one tenth, so that between the two walls there is formed an annular meatus in which the interposed air, caused to rotate by the disc 11, has a centrifugal velocity component which determines a head between the inner periphery and outer periphery of said annular meatus. The reference numeral 12 indicates a collection chamber for the lubricating oil of the bearing 4. The chamber is provided with an annular chamber 13, the wall of which intersects the wall 18 of the annular passage 16 at a sharp edge, the chamber also being provides with a drain hole indicated by 21.

The reference numeral 15 indicates a second chamber provided in the stator and communicating at one end with the ambient air by way of the hole 14 and at the other end with the inner periphery of the annular meatus formed by the wals 18 and 19, by way of the annular interstice 25 formed between the stator and the sleeve 10. The sleeve 10 is provided with annular projections 20 which together with the annular cavities lying between them and the body of the stator 1 form a labyrinth seal for the purpose of isolating the chamber 15 from the zone 24 lying between the rear end of the impeller 3 and the body 1. Vacuum can arise in this zone, which could disturb the pressure conditions in the chamber 15, reducing it to below atmospheric pressure. When the turbo compressor operates and the shaft 2 rotates, the disc 11 which has its peripheral zone tapered projects the lubricating oil leaving the bearing 4 into the collection chamber 12 by centrifugal force.

Part of the oil which adheres to the walls of the chamber 12 is conveyed to the bottom of the channel 13 and is prevented from re-flowing into the meatus between the walls 18 and 19 by the air stream with the centrifugal velocity component which flows into said meatus, drawn by the chamber 15.

The lubricating oil is thus prevented from leaving the chamber 12 and moving along the sleeve 10 into the zone 24 lying between the rear end of the impeller and the stator, where vacuum conditions can occur.

I claim:

1. A lubricating oil seal device for a bearing supporting a shaft of a turbo compressor rotating in a stator, comprising a lubricating oil collecting chamber in said stator having a drain hole, an annular passage being defined by flat wall portions of said stator and extending perpendicular to said shaft and adjacent said collection chamber and said bearing to allow lubricating oil to flow from said bearing into said collection chamber, a disc member being rigid with said shaft at one end of said bearing and rotatable within said annular passage close to at least one of said flat wall portions to form an annular meatus between said one of said flat wall portions and a flat surface of said disc member opposite said bearing, and a port in said stator providing fluid communication between a radially internal annular portion of said meatus and an external environment.

2. A seal device as claimed in claim 1, wherein said annular meatus has a thickness which is not more than a few tenths of a millimeter.

3. A seal device as claimed in claim 1, wherein said collection chamber has an annular channel defined by a concave wall portion of said collection chamber, said concave wall portion intersecting said one of said flat wall portions defining said annular passage.

4. A seal device as claimed in claim 1, further comprising a substantially annular chamber in said stator and an annular interstice concentric with said shaft of said compressor and providing fluid communication between said radially internal annular portion of said meatus and said annular chamber, said annular chamber further communicating with said external environment through said port.

5. A seal device as claimed in claim 1, further comprising a labyrinth seal arranged between said stator and said shaft and defining a sealing means between a delivery side of said compressor and said external environment, said labyrinth seal communicating with said external environment by way of said annular chamber and said port.

6. A seal device as claimed in claim 1, further comprising a labyrinth seal arranged between said stator and said shaft and defining a sealing means between a delivery side of said compressor and said external environment.

* * * * *